United States Patent
Ierullo

(10) Patent No.: US 9,218,320 B2
(45) Date of Patent: Dec. 22, 2015

(54) METHODS AND APPARATUS TO PROVIDE ELECTRONIC BOOK SUMMARIES AND RELATED INFORMATION

(75) Inventor: Salvatore Ierullo, Oakville, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 516 days.

(21) Appl. No.: 13/583,571

(22) PCT Filed: Jul. 12, 2011

(86) PCT No.: PCT/CA2011/050422
§ 371 (c)(1),
(2), (4) Date: Sep. 7, 2012

(87) PCT Pub. No.: WO2013/006944
PCT Pub. Date: Jan. 17, 2013

(65) Prior Publication Data
US 2013/0151954 A1    Jun. 13, 2013

(51) Int. Cl.
*G06F 17/21* (2006.01)
*G06F 17/30* (2006.01)
*G06F 3/0484* (2013.01)
*G09B 5/02* (2006.01)
*G06F 3/147* (2006.01)

(52) U.S. Cl.
CPC ............ *G06F 17/21* (2013.01); *G06F 3/04842* (2013.01); *G06F 17/30861* (2013.01); *G09B 5/02* (2013.01); *G06F 3/147* (2013.01); *G09G 2380/14* (2013.01)

(58) Field of Classification Search
USPC ......... 715/205, 209, 232, 234, 254, 256, 760, 715/772, 859
See application file for complete search history.

(56) References Cited

U.S. PATENT DOCUMENTS

| | | | | |
|---|---|---|---|---|
| 5,774,109 | A * | 6/1998 | Winksy et al. | 345/685 |
| 7,117,437 | B2 * | 10/2006 | Chen et al. | 715/254 |
| 7,516,073 | B2 * | 4/2009 | Kodama | 704/270 |
| 7,698,339 | B2 * | 4/2010 | Zhang et al. | 707/755 |
| 8,434,001 | B2 * | 4/2013 | Kandekar et al. | 715/234 |
| 8,850,006 | B2 * | 9/2014 | Ashear | 709/224 |
| 8,914,386 | B1 * | 12/2014 | Story et al. | 707/752 |
| 2004/0117740 | A1 * | 6/2004 | Chen et al. | 715/531 |
| 2004/0201633 | A1 * | 10/2004 | Barsness et al. | 345/864 |

(Continued)

FOREIGN PATENT DOCUMENTS

| | | |
|---|---|---|
| JP | 6187382 | 7/1994 |
| JP | 2006155125 | 6/2006 |
| WO | 2006/036782 | 4/2006 |

OTHER PUBLICATIONS

Yoon et al., "Touch-Bookmark: A Lightweight Navigation and Bookmarking Technique for e-Books," May 12, ACM, pp. 1189-1194.*

(Continued)

*Primary Examiner* — Maikhanh Nguyen
(74) *Attorney, Agent, or Firm* — Fish & Richardson P.C.

(57) ABSTRACT

Example methods and apparatus to display summary information for an electronic book are disclosed. A disclosed example method involves, during an electronic book reader session, receiving a request for a summary associated with an electronic book. The example method also involves obtaining a marker indicative of a location in the electronic book and obtaining the summary for a portion of the electronic book demarcated by the marker. The summary is displayed via the electronic book reader.

8 Claims, 9 Drawing Sheets

(56) References Cited

U.S. PATENT DOCUMENTS

| | | | |
|---|---|---|---|
| 2004/0261016 A1 | 12/2004 | Glass et al. | |
| 2005/0069849 A1 | 3/2005 | McKinney et al. | |
| 2005/0096938 A1 | 5/2005 | Slomkowski et al. | |
| 2006/0036596 A1* | 2/2006 | Zhang et al. | 707/5 |
| 2006/0047504 A1* | 3/2006 | Kodama | 704/200 |
| 2011/0066965 A1* | 3/2011 | Choi | 715/776 |
| 2012/0210203 A1* | 8/2012 | Kandekar et al. | 715/230 |
| 2012/0233242 A1* | 9/2012 | Murray et al. | 709/203 |
| 2012/0254738 A1* | 10/2012 | Kuroda et al. | 715/254 |
| 2013/0024768 A1* | 1/2013 | Jeon | 715/254 |
| 2013/0298067 A1* | 11/2013 | Parker et al. | 715/776 |

OTHER PUBLICATIONS

Watnable et al. "Bookisheet: Bendable Device for Browsing Content Using the Metaphor of Leafing Through the Pages," 2008 ACM, pp. 360-369.*

D.H. Lie, "Sumatra: A System for Automatic Summary Generation," Carp Technologies, 1998, 6 pages.*

Ed H. Chi et al. "eBooks with Indexes that Reorganize Conceputally," 2004 ACM, pp. 1223-1226.*

Patent Cooperation Treaty, "International Preliminary Report on Patentability," issued by the International Bureau in connection with PCT Application No. PCT/CA2011/050422, mailed on Jan. 23, 2014 (7 pages).

Patent Cooperation Treaty, "Written Opinion of the International Searching Authority," issued by the International Searching Authority in connection with PCT/CA2011/050422, mailed Mar. 23, 2012 (5 pages).

Patent Cooperation Treaty, "International Search Report," issued by the International Searching Authority in connection with PCT application No. PCT/CA2011/050422, mailed Mar. 23, 2012 (3 pages).

Cliff Notes, Wiley Publishing, Inc., "To Kill a Mockingbird," Harper Lee, Book Summary [retrieved from http://www.cliffsnotes.com/study_guide/literature/To-Kill-a-Mockingbird-Book-Summary.id-143,pageNum-2.html on May 3, 2011] 2 pages.

Spark Notes, Spark Notes LLC, "To Kill a Mockingbird," Harper Lee, Context Summary [retrieved from http://www.sparknotes.com/lit/mocking/context.html on May 3, 2011] 2 pages.

* cited by examiner ic devices and, more particularly, to methods and apparatus to
METHODS AND APPARATUS TO PROVIDE ELECTRONIC BOOK SUMMARIES AND RELATED INFORMATION This is a U.S. national stage application under 35 U.S.C. 371 of International Application No. PCT/CA2011/050422, filed on Jul. 12, 2011, which is hereby incorporated herein by reference in its entirety.

FIELD OF THE DISCLOSURE

The present disclosure relates generally to electronic devices and, more particularly, to methods and apparatus to provide electronic book summaries and related information.

BACKGROUND

The preferred medium for distributing books has traditionally been paper print. New technologies have enabled publishing books and stories in electronic media such as electronic books, more commonly referred to as e-books. E-book technologies offer users the ability to store significant quantities of books and stories using substantially less physical space than traditional paper books. E-books are typically digital formats of text storable on computer-readable memories and accessible for reading via e-book reader devices, e-book reader applications, and/or web-based interfaces. For example, a user may store one or more e-books on a computer hard-drive or other mass storage memory and access the e-book(s) using an e-book reader application executed by the computer. In other examples, a user may store one or more e-books on a memory of a portable electronic device and access the e-book(s) using an e-book reader application executed by the portable electronic device. In yet other examples, a user may store one or more e-books at an Internet-based e-book service (e.g., cloud-based storage) and access the e-book(s) via a web interface and/or an e-book reader application executed by a stationary computer and/or a portable electronic device capable of employing network/Internet communications.

DETAILED DESCRIPTION

Figure 1:
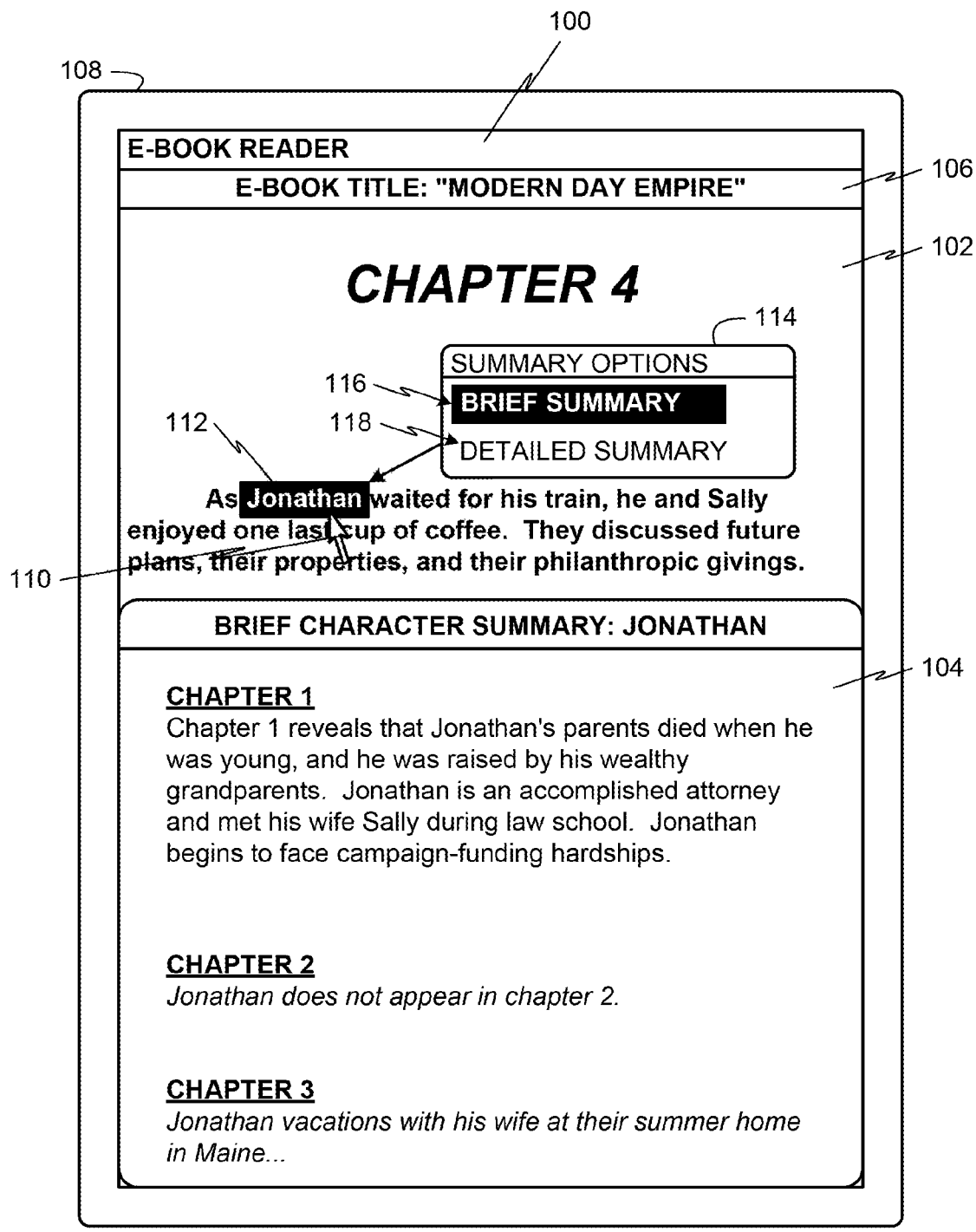
FIG. 1 illustrates an example graphical user interface (GUI) of an electronic book (e-book) reader showing summary options for displaying summary information related to a selected character name.

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

It will be appreciated that, for simplicity and clarity of illustration, where considered appropriate, reference numerals may be repeated among the figures to indicate corresponding or analogous elements. In addition, numerous specific details are set forth in order to provide a thorough understanding of example embodiments disclosed herein. However, it will be understood by those of ordinary skill in the art that example embodiments disclosed herein may be practiced without these specific details. In other instances, well-known methods, procedures and components have not been described in detail so as not to obscure example embodiments disclosed herein. Also, the description is not to be considered as limiting the scope of example embodiments disclosed herein.

Example methods, apparatus, and articles of manufacture are disclosed herein in connection with mobile devices, which may be any mobile communication device, mobile computing device, or any other element, entity, device, or service capable of communicating wirelessly. Mobile devices, also referred to as terminals, wireless terminals, mobile stations, communication stations, or user equipment (UE), may include mobile smart phones (e.g., BlackBerry® smart phones), wireless personal digital assistants (PDA), tablet/laptop/notebook/netbook computers with wireless adapters, etc. In some examples, disclosed example methods, apparatus, and articles of manufacture may be implemented in connection with Bluetooth® wireless communication technologies, the wireless local area network (WLAN) communication standard known as IEEE® 802.11, ZIGBEE® radio technology, wireless USB radio technology, and ultra-wideband (UWB) radio technology, or any other WLAN standards or personal area network (PAN) standards.

Examples disclosed herein may be implemented using dedicated e-book devices, e-book reader applications executed by portable electronic devices (e.g., wireless communication devices, smart phones, dedicated e-book reader devices, personal digital assistants (PDAs), tablets, etc.) and/or stationary personal computers. In some examples, examples disclosed herein may also be implemented using Internet-based or web-based e-book services in which users access e-books from a cloud-based data store or some other form of Internet-accessible data store.

Example methods, apparatus, and articles of manufacture disclosed herein may be used to provide electronic book (e-book) summaries and related information for users via graphical user interfaces (GUIs) of e-book readers or e-book viewers. In some examples, such e-book summaries may be summaries related to particular characters portrayed in e-books. For example, as a user progresses through an e-book, the user may request a summary of information pertinent to or related to one or more particular characters and/or the user may request general summary information related to the e-book such as plot(s), theme(s), character(s), relationship(s), event(s), etc. Examples disclosed herein enable a user to view such summary information without exposing the user to details or information related to portions of the e-book that the user has not yet read. Disclosed examples can track a users progress through an e-book and record such progress using progress markers after each reading session. In this manner, when a user returns to a particular e-book and requests summary information, an e-book reader application can determine the portion(s) of the e-book for which to display the requested summary information without showing details that would spoil or reveal information about other portions of the e-book not yet read by the user.

In some examples, summary information is stored locally in the same device or computer that executes the e-book reader application and/or is stored remotely at an Internet-accessible or network-accessible data store and retrieved by a device or computer that executes the e-book reader application. In some examples, supplemental information or other information related to an e-book other than summary information may be displayed by an e-book reader. For example, such other related or supplemental information may include user notes or commentaries and/or notes or commentaries of other users that are related to the same e-book title, real-world facts, author notes or commentaries, references to related readings or citations, etc. In some examples, such related or supplemental information is stored locally in the same device or computer that executes the e-book reader application and/or is stored remotely at an Internet-accessible or network-accessible data store and retrieved by a device or computer that executes the e-book reader application. Internet-accessible storage locations may include, for example, wiki information repositories, blogs, web-feeds, fee-based data storage sites, e-book publisher-provided storage sites, e-book reseller storage sites, etc.

Turning to FIG. 1, an example e-book reader 100 (or e-book viewer) displays an example GUI 102 showing a brief character summary section 104 displayed with a page of an e-book 106 (e.g., an e-book titled "Modern Day Empire" in the illustrated example). In the illustrated example, the e-book reader 100 is an application executed by a mobile device 108 (e.g., a smart phone, a tablet, a mobile computing device, etc.). Alternatively, the e-book reader 100 may be executed by any other computing device and/or may be a dedicated e-book reader device. In the illustrated example, the e-book reader 100 shows a user-navigation pointer 110 with which a user has highlighted a character name "Jonathan" 112 of a character portrayed in the displayed e-book. In other examples, the mobile device 108 may have a touch-sensitive screen, in which cases, user-input ordinarily provided via the user-navigation pointer 110 are instead provided by touch and/or stroke gestures.

To view a character summary for the character identified by the character name "Jonathan" 112, a user selects the highlighted character name "Jonathan" 112 appearing in the text of the e-book. In response to sensing the highlighting and selection of the character name 112, the e-book reader 100 of the illustrated example displays a summary options menu 114 including a brief summary user-selectable option 116 and a detailed summary user-selectable option 118. The brief summary user-selectable option 116 enables a user to select and be provided with a short or brief summary of a selected character, and the detailed summary user-selectable option 118 enables a user to select and be provided with a longer or more detailed summary of the selected character. In the illustrated example, a character summary may show information describing physical characteristics, personality characteristics, relationships between the selected character and other characters, events related to the character, and/or any other information related to the character that would be of interest.

In some examples, the example e-book reader 100 automatically determines whether to display a brief summary or a detailed summary based on the duration since a most recent previous reader session of the displayed e-book for the user requesting the summary. For example, for each user that uses the example e-book reader 100, the example e-book reader 100 of the illustrated example records or logs progress markers (e.g., progress markers 304a-d of FIGS. 3 and 4) for e-books read by those users. When a user requests a summary, the e-book reader retrieves a progress marker (e.g., the most recently created progress marker) corresponding to the user for the displayed e-book (e.g., the e-book 106 and determines whether a time/date stamp of the progress marker is indicative of a lapsed duration that is longer than a threshold value. If the duration is greater than the threshold value, the e-book reader 100 displays a detailed summary, whereas if the duration is less than or equal to the threshold value, the e-book reader 100 displays a brief summary. In this manner, detailed summaries can be displayed when users are less likely to have remembered or retained important or interesting details of an e-book, and brief summaries can be displayed when users are more likely to continue to retain or remember relatively more details of the e-book.

When the e-book reader 100 receives a user-selection for a brief summary or a detailed summary or automatically determines whether to display a brief summary or a detailed summary, the e-book reader 100 can retrieve and/or generate the requested summary information and display the summary information via the character summary section 104. In the illustrated example, the e-book reader 100 displays character summary information only for chapters 1-3 after determining that a logged progress marker for the user indicates that the user has only read through chapter 3 of the e-book 106. In this manner, the e-book reader 100 does not display details about a character of the selected character name that are revealed in subsequent portions of the e-book 106 that the user has not yet read. In the illustrated example, the character summary section 104 shows a brief summary of information revealed about the character "Jonathan" in chapters 1 and 3 and indicates that the character "Jonathan" does not appear in chapter 2. However, since the requesting user has not read further than chapter 3, the e-book reader 100 does not show further information about the character "Jonathan" that will be revealed in chapters 4 and beyond.

Figure 2:
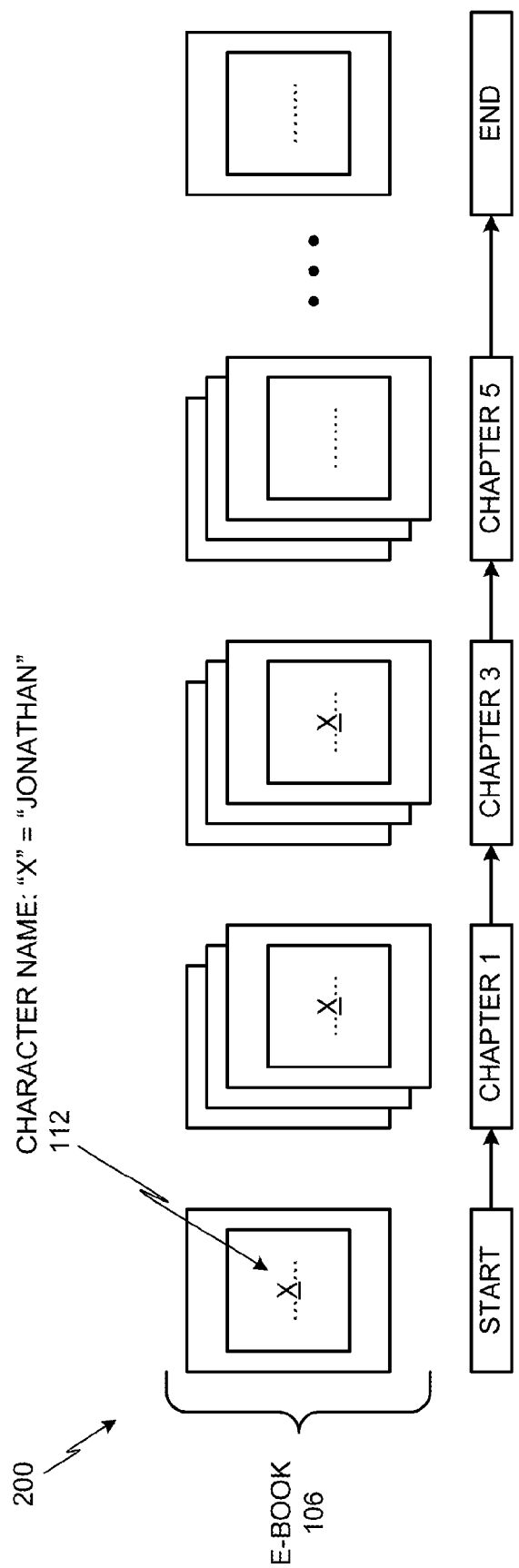
FIG. 2 illustrates an example storyline representation of portions of an e-book in which a particular character name appear.

FIG. 2 illustrates an example storyline representation 200 of portions of the e-book 106 of FIG. 1 in which a particular character name "X" 112 appears. In the illustrated example, the character name "X" 112 is shown as appearing in chapters 1 and 3. In the illustrated example, the character name "X" 112 represents the highlighted character name "Jonathan" 112 of FIG. 1. In examples in which the e-book reader 100 of FIG. 1 dynamically generates summaries, the e-book reader 100 can scan or search through the portions of the e-book 106 in which the selected character name "X" appears. If the user has only read through chapters 1 and 2, as in the illustrated example of FIG. 1, the e-book reader 100 scans or searches through only chapters 1 and 2 for the character name "X" and generates a summary (e.g., a brief summary or a detailed summary) describing information revealed in chapters 1 and 2 about the character identified by the character name "X." In some examples, to dynamically generate summary information, the e-book reader 100 recognizes relevant information surrounding (e.g., proximally located to) each instance of the character name "X" and organizes the relevant information into a summary format. Additionally or alternatively, the e-book reader 100 may be configured to dynamically retrieve summary information from metadata provided in the e-book 106 or in connection with the e-book 106 by, for example, publishers, e-book resellers, third-party summary providers, etc. and generate brief or detailed summaries based on such metadata information.

Figure 3:
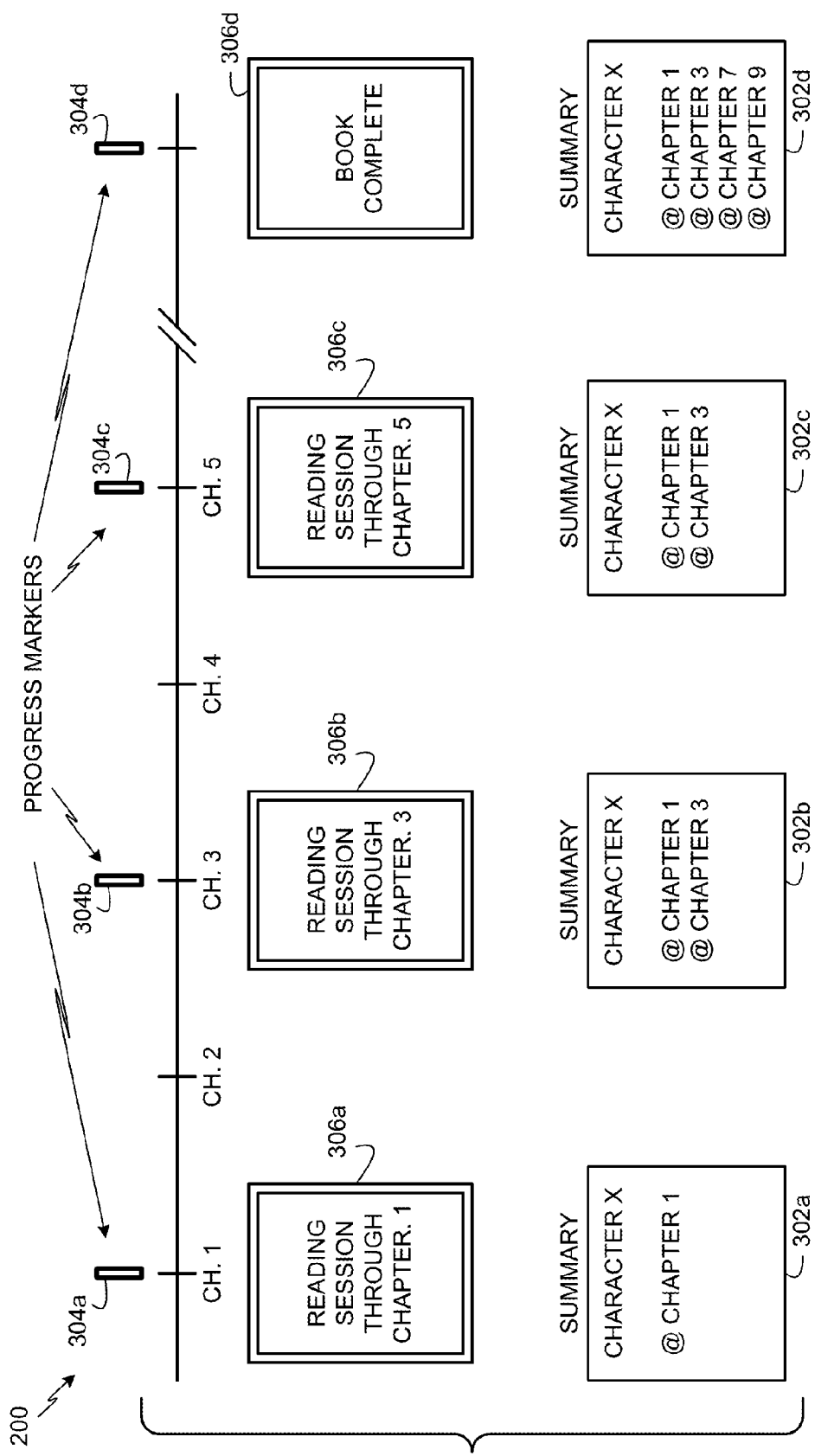
FIG. 3 illustrates the example e-book portions of FIG. 2 and character summaries for the character name of FIGS. 1 and 2 based on a user's progress through the e-book.

FIG. 3 illustrates the portions of the e-book 106 of FIG. 2 and corresponding character summaries 302a-d for the character name 112 of FIGS. 1 and 2 based on a user's progress through the e-book 106 (FIG. 1). In the illustrated example, a users progress points through the storyline 200 are demarcated using progress markers 304a-d. For example, when a user has completed reading through chapter 1 during a first reading session 306a of the book 106 (FIG. 1), the e-book reader 100 of FIG. 1 generates and stores a first progress marker 304a. In this manner, when the user picks up the e-book 106 again at some later time and/or date and requests summary information or any other information related to the e-book 106, the e-book 106 can refer to the first progress marker 304a to determine the user's progress through the e-book 106 and to determine the amount of time that has lapsed since the users most recent previous reading session of the e-book 106. The e-book reader 100 can then generate the character summary 302a corresponding to the users progress through the e-book 106 as demarcated by the progress marker 304a.

If the user completes reading through chapter 3 during a next reading session 306b, the e-book reader 100 generates and stores the progress marker 304b. In this manner, the e-book reader 100 can generate the character summary 302b when the user subsequently picks up the e-book 106 again. In the illustrated example, the character name "X" appears in chapters 1 and 3 but not in chapter 2 and, thus, the character summary 302b shows character summary information for chapters 1 and 3 but not for chapter 2.

In the illustrated example, the e-book reader 100 generates and stores the progress marker 304c when the user finishes reading through chapter 5 and generates and stores the progress marker 304d when the user completes reading the e-book 106. For the progress marker 304c, the e-book reader 100 generates the character summary 302c, which is the same as the character summary 302b, because the character name "X" appears in chapters 1 and 3 but not in chapters 2, 4, and 5 in the illustrated example. For the progress marker 304d, the e-book reader 100 generates the character summary 302d, which is a character summary for the entire e-book 106 for the character name "X." As shown in the character summary 302d, the character name "X" appears in chapters 1, 3, 7, and 9 and, thus, the e-book reader 100 provides summary information related to the character name "X" for chapters 1, 3, 7, and 9 in the character summary 302d.

Although the illustrated example of FIG. 3 shows the summaries 302a-d generated based on the progress through the e-book 106 as demarcated by the progress markers 304a-d, in other examples the e-book reader 100 is configured to receive user requests for summary and/or other related or supplemental information along with user-indications of one or more portions of an e-book for which the requested summary and/or supplemental information should correspond. For example, a user may not want to read the e-book 106 in its entirety but may be interested in one or more portions of the e-book 106. In some examples, to facilitate access to such portion(s), the e-book reader 100 may receive an indication or input from a user designating the portion(s) of interest. In this manner, the e-book reader 100 can obtain, retrieve, or generate the summary and/or supplemental information for the indicated portion and display the same to the user without the user needing to read through the e-book 106.

Figure 4:
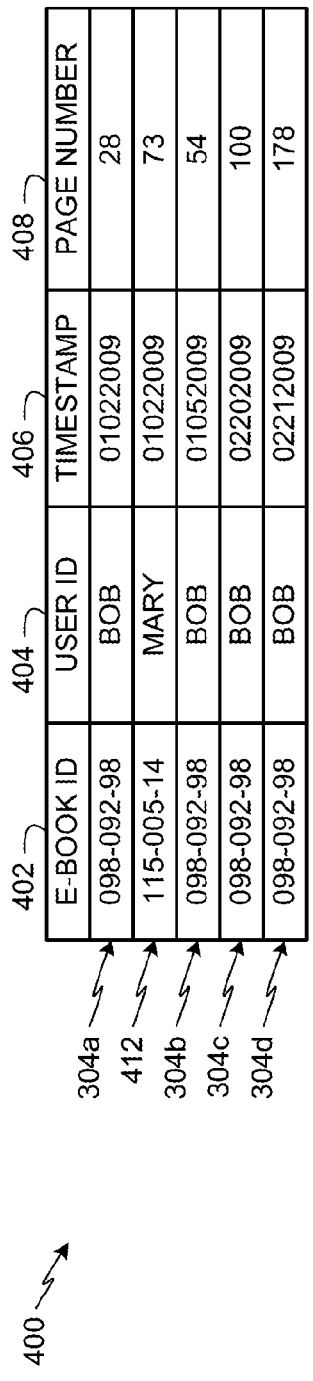
FIG. 4 illustrates an example session log data structure to store progress markers indicative of a user's progress through an e-book.

FIG. 4 illustrates an example session log data structure 400 to store progress markers (e.g., the progress markers 304a-d of FIG. 3) indicative of a user's progress through the e-book 106 of FIG. 1. The example session log data structure 400 stores progress markers (e.g., the progress markers 304a-d of FIG. 3 and a progress marker 412) corresponding to one or more e-books read by one or more users via the e-book reader 100. The example session log data structure 400 may be stored locally in the mobile device 108 of FIG. 1 or remotely at an Internet-accessible or network-accessible data store.

In the illustrated example, the session log data structure includes an e-book identifier (ID) column 402, a user ID column 404, a timestamp column 406, and a page number column 408. In the illustrated example, the e-book ID column 402 stores e-book IDs corresponding to e-books read via the e-book reader 100, and the user ID column 404 stores user IDs of users that read e-books via the e-book reader 100. Also in the illustrated example, the timestamp column 406 stores date/time stamps indicative of dates and/or times of reading sessions (e.g., the reading sessions 306a-d of FIG. 3) corresponding to respective ones of the progress markers 304a-d and 412. The page number column 408 of the illustrated example stores page numbers through which users read during reading sessions (e.g., the reading sessions 306a-d of FIG. 3) corresponding to respective ones of the progress markers 304a-d and 412.

In the illustrated example of FIG. 4, the progress markers 304a-d indicate the progress made by a user named "Bob" through the e-book 106 having e-book ID "098-092-98," and the progress marker 412 indicates the progress made by a user named "Mary" through an e-book having e-book ID "115-005-14."

Figure 5:
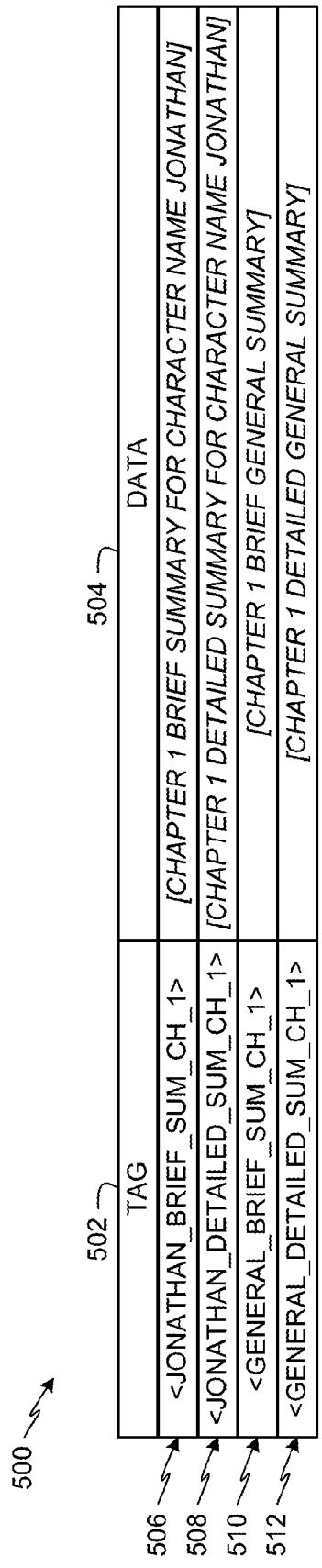
FIG. 5 illustrates an example e-book metadata data structure to store e-book summary information and/or other related or supplemental information as metadata.

FIG. 5 illustrates an example e-book metadata data structure 500 to store e-book summary information and/or other related or supplemental information as metadata. In some examples, the e-book reader 100 obtains, retrieves, or generates summaries based on metadata stored in a data structure substantially similar or identical to the e-book metadata data structure 500. The metadata depicted in the e-book metadata data structure 500 may be provided in the e-book 106 or in connection with the e-book 106 by, for example, publishers, e-book resellers, third-party summary providers, etc. For example, a publisher may embed summary information and/or other related or supplemental information as metadata in the e-book 106 and distribute the e-book 106 with the metadata. Alternatively, the publisher or a third-party may provide or sell summary information and/or other related or supplemental information as metadata that is separate from the e-book 106 (e.g., as a separate electronic file) and accessible locally on the mobile device 108 or remotely via Internet or network communications.

In the illustrated example of FIG. 5, the e-book metadata data structure 500 includes a tag column 502 that stores metadata tags that identify different types of supplemental information (e.g., summaries or any other type of supplemental information) that is available for the e-book 106. The e-book metadata data structure 500 of the illustrated example also includes a data column 504 that stores supplemental information (e.g., summaries or any other type of supplemental information) identified to corresponding ones of the metadata tags in the tag column 502. In the illustrated example, the e-book metadata data structure 500 is shown as having metadata records for a brief summary of the character name Jonathan for chapter 1 indicated by reference numeral 506, a detailed summary of the character name Jonathan for chapter 1 indicated by reference numeral 508, a general brief summary for chapter 1 indicated by reference numeral 510, and a general detailed summary for chapter 1 indicated by reference numeral 512. Although only summary information is shown in FIG. 5, the e-book metadata data structure 500 may also store other types of supplemental or related information including, for example, real-world facts, author notes or commentaries, references to related readings or citations, etc. In some examples, the e-book metadata data structure 500 may additionally or alternatively store user-created notes in metadata format.

Figure 6:
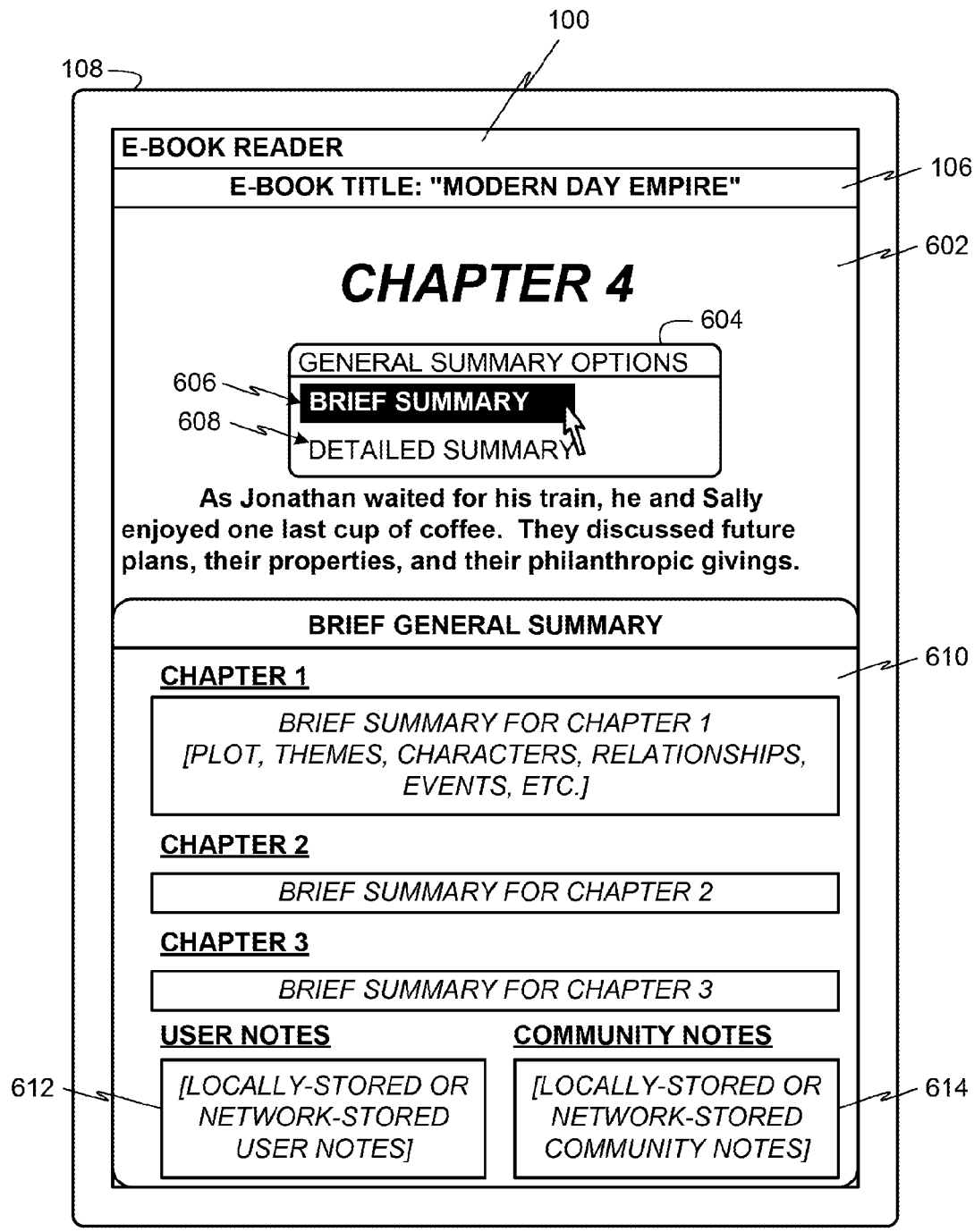
FIG. 6 illustrates another example GUI of the e-book reader of FIG. 1 showing general summary options for displaying general summaries and/or other related information associated with the e-book.

FIG. 6 illustrates another example GUI 602 of the e-book reader 100 of FIG. 1 showing a general summary options menu 604 for displaying general summaries and/or other related information associated with the e-book 106. In the illustrated example, the e-book reader 100 displays the general summary options menu 604 in response to a user request for the same. In the illustrated example, the general summary options menu 604 enables a user to request summaries related generally to the overall contents of the e-book 106 and such summaries are not limited to information related to particular characters. Example general summaries may include information related to plot(s), theme(s), character(s), relationship(s), event(s), and/or any other information. In some examples, the e-book reader 100 may dynamically generate such general summaries and/or obtain or retrieve the general summaries (e.g., based on information in the e-book metadata data structure 500 of FIG. 5 and/or any other data store).

The general summary options menu 604 of the illustrated example shows a brief summary user-selectable option 606 that a user can select to obtain brief or short summaries and a detailed summary user-selectable option 608 that a user can select to obtain relatively longer or more detailed summaries. In some examples, the e-book reader 100 is configured to automatically determine whether to provide brief or detailed summaries based on the amount of lapsed time since a user previously read the e-book 106, as described above in connection with FIG. 1.

In the illustrated example, the e-book reader 100 detects a user selection of the brief summary user-selectable option 606 and displays a brief general summary section 610. To determine how much information to display in the brief general summary section 610, the e-book reader 100 retrieves a progress marker (e.g., the progress marker 304b of FIGS. 3 and 4) of the most recent reader session by the requesting user for the e-book 106. The progress marker 304b indicates that the user has read through chapter 3, as shown in FIG. 3. As such, the e-book reader 100 displays summary information for chapters 1-3 in the brief general summary section 610 of the illustrated example.

Also shown in the brief general summary section 610 of the illustrated example are a user notes section 612 and a community notes section 614. In the illustrated example, the user notes section 612 displays notes or commentaries created by the requesting user that are associated with the e-book 106. For example, as the user reads through the e-book 106, the user may create notes of particular points of interest, to highlight specific text, or for any other purpose and store the user notes locally (e.g., on the mobile device 108) or remotely (e.g., at Internet-accessible or network-accessible data stores). In this manner, during subsequent reading sessions, the user can access previously created notes as shown in FIG. 6.

In the illustrated example, the community notes section 614 displays notes or commentaries created by other users that are associated with the e-book 106. For example, the e-book reader 100 may locally access notes or commentaries created by other users of the e-book reader 100 that are locally stored in the e-book reader 100 and/or access notes or commentaries created by other users that are remotely stored at Internet-accessible or network-accessible data stores. The e-book reader 100 can retrieve community notes or commentaries associated with portions of the e-book 106 through which the requesting user has read and display the retrieved information in the community notes section 614. In some examples, community notes or commentaries may be stored in and accessed from wiki information repositories, blogs, web-feed servers, fee-based data storage sites, e-book publisher-provided storage sites, e-book reseller storage sites, and/or any other data store accessible by the e-book reader 100. In this manner, the e-book reader 100 can display community notes or commentaries created by other users as shown in FIG. 6 so that a user can review comments, ideas, interpretations, etc. of other users related to the e-book 106.

Although not shown, in some examples the general summary options menu 604 may have a user notes user-selectable option and a community notes user-selectable option to enable a user to request the user notes section 612 and/or the community notes section 614. In other examples, the e-book reader 100 may unconditionally display the user notes section 612 and/or the community notes section 614 any time it detects a user-request for summary information.

Figure 7:
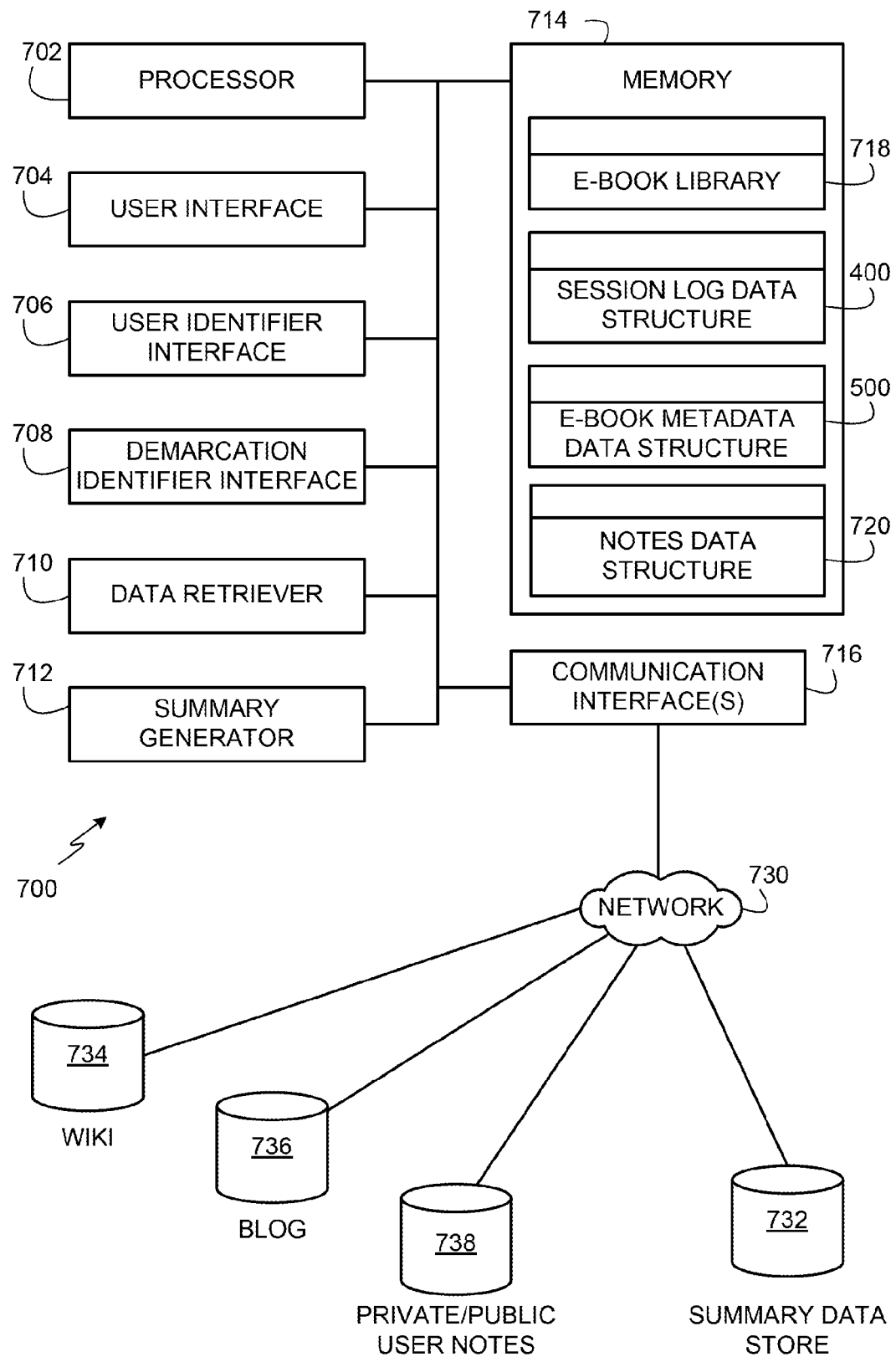
FIG. 7 illustrates an example apparatus that may be used to implement the example e-book reader of FIGS. 1 and 6.

FIG. 7 illustrates an example apparatus 700 that may be used to implement the example e-book reader 100 of FIGS. 1 and 6. In the illustrated example of FIG. 7, the apparatus 700 is provided with a processor 702, a user interface 704, a user identifier interface 706, a demarcation identifier interface 708, a data retriever 710, a summary generator 712, a memory 714, and one or more communication interfaces 716. The processor 702, the user interface 704, the user identifier interface 706, the demarcation identifier interface 708, the data retriever 710, the summary generator 712, the memory 714, and/or the one or more communication interfaces 716 may be implemented using any desired combination of hardware, firmware, and/or software. For example, one or more integrated circuits, discrete semiconductor components, and/or passive electronic components may be used. Thus, for example, the processor 702, the user interface 704, the user identifier interface 706, the demarcation identifier interface 708, the data retriever 710, the summary generator 712, the memory 714, and/or the one or more communication interfaces 716, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The processor 702, the user interface 704, the user identifier interface 706, the demarcation identifier interface 708, the data retriever 710, the summary generator 712, the memory 714, and/or the one or more communication interfaces 716, or parts thereof, may be implemented using instructions, code, and/or other software and/or firmware, etc. stored on a machine-accessible medium or computer-readable medium (e.g., the memory 714 of FIG. 7 or a memory 808 of FIG. 8) and executable by, for example, a processor (e.g., the example processor 702 of FIG. 7 or a processor 802 of FIG. 8). When any of the appended claims are read to cover a purely software implementation, at least one of the processor 702, the user interface 704, the user identifier interface 706, the demarcation identifier interface 708, the data retriever 710, the summary generator 712, the memory 714, or the one or more communication interfaces 716 is hereby expressly defined to include a tangible medium such as a solid state memory, a magnetic memory, a DVD, a CD, etc.

Turning in detail to FIG. 7, the apparatus 700 of the illustrated example is provided with the example processor 702 to control and/or manage operations of the e-book reader 100 and/or the mobile device 108 of FIGS. 1 and 6. In the illustrated example, the processor 702 receives information from one or more of the user interface 704, the user identifier interface 706, the demarcation identifier interface 708, the data retriever 710, the summary generator 712, the memory 714, and/or the one or more communication interfaces 716 and makes decisions and facilitates information exchange in and outside of the e-book reader 100 and/or the mobile device 108.

To present and/or display information to a user and to receive user input, the apparatus 700 is provided with the example user interface 704. In the illustrated example, the user interface 704 is to be connected to one or more output devices (e.g., a display 810 and/or a speaker 818 of FIG. 8) and connected to one or more input devices (e.g., a keyboard 816 and/or a microphone 820 of FIG. 8) to enable interactivity between the e-book reader 100 and a user.

To identify users of the e-book reader 100, the apparatus is provided with the example user identifier interface 706. The user identifier interface 706 of the illustrated examples receives user names and/or other user identifiers provided by or selected by users of the e-book reader 100 during reading sessions. For example, the users may enter names (e.g., the names "Bob" and "Mary" shown in the session log data structure 400 of FIG. 4) or other suitable user identifiers to uniquely identify users of the e-book reader 100.

To determine demarcated segments or portions of e-books (e.g., the e-book 106 of FIGS. 1 and 5) corresponding to user-requested summary information or other information related to the e-books, the apparatus 700 is provided with the example demarcation identifier interface 708. In the illustrated example, the demarcation identifier interface 708 accesses the session log data structure 400 of FIG. 4 to store and/or update progress markers (e.g., the progress markers 304*a-d* and 412 of FIGS. 3 and 4) during and/or after reading sessions (e.g., the reading sessions 306*a-d* of FIG. 3) to demarcate or indicate user progress through a respective e-book (e.g., the e-book 106 of FIGS. 1 and 6). In addition, to generate summary information or other information related to an e-book (e.g., the e-book 106) during a reading session (e.g., one of the reading sessions 306*a-d* of FIG. 3), the demarcation identifier interface 708 of the illustrated example retrieves or otherwise obtains a progress marker (e.g., one of the progress markers 304*a-d* and 412 of FIGS. 3 and 4) of the most recent previous reading session corresponding to the user and the e-book for which the information is requested. The demarcation identifier interface 708 then determines the users progress through the e-book based on, for example, a page number noted in the progress marker.

In some examples, the demarcation identifier interface 708 determines segments or portions of e-books for which to generate summary or other related information based on user-provided markers (e.g., page numbers, page ranges, specific chapters, chapter ranges, section numbers, etc.) instead of using progress markers (e.g., instead of the progress markers 304*a-d* and 412 of FIGS. 3 and 4). In this manner, the user need not read through the e-book 106 to request summary or other related information.

To retrieve data, the apparatus 700 is provided with the example data retriever 710. The data retriever 710 of the illustrated example accesses local memory (e.g., the memory 714 of FIG. 7 or a RAM 806 or a memory 808 of FIG. 8) or remotely located data stores (e.g., a summary data store 732, a wiki data store 734, a blog data store 736, and/or a private/public user notes data store 738 of FIG. 7) to retrieve summary information or other information related to e-books (e.g., one or more of the character summaries 302*a-d* of FIG. 3, the summary information shown in the brief character summary section 104 of FIG. 1, the summary information shown in the brief general summary section 610 of FIG. 6, the user-notes shown in the user notes section 612 of FIG. 6, and/or the community notes shown in the community notes section 614 of FIG. 6). In the illustrated example, the data retriever 710 accesses the e-book metadata data structure 500 of FIG. 5 to retrieve summary information or other related information that is locally stored in association with the e-book 106 (FIGS. 1 and 6). Additionally or alternatively, the e-book metadata data structure 500 can access any other locally stored e-book-related information requested by a user.

To generate summaries (e.g., one or more of the character summaries 302*a-d* of FIG. 3, the summary information shown in the brief character summary section 104 of FIG. 1, and/or the summary information shown in the brief general summary section 610 of FIG. 6), the apparatus 700 is provided with the example summary generator 712. In the illustrated example, when a user requests summary information that is not pre-generated and locally stored (e.g., the pre-generated and locally stored summary information of the e-book metadata data structure 500 of FIG. 5), the summary generator 712 analyzes one or more portions or segments indicated by the demarcation identifier interface 708 and dynamically (e.g., in real-time) generates summary information for the indicated portion(s). In some examples, to dynamically generate summary information, the summary generator 712 of the illustrated example recognizes relevant information in the one or more portions identified by the demarcation identifier interface 708 and organizes the relevant information into a summary format. For character summaries, the summary generator 712 of the illustrated example recognizes relevant information surrounding (e.g., proximally located to) each instance of a character name (e.g., the character name "Jonathan" or "X" of FIGS. 1-3) and organizes the relevant information into a summary format.

To store data and/or machine-readable or computer-readable instructions, the apparatus 700 is provided with the example memory 714. The memory 714 of the illustrated example is implemented using the memory 808 of FIG. 8. However, in other examples, the memory 714 may be implemented using any other solid state, magnetic, or optical memory. In the illustrated example, the memory 714 is shown as storing an e-book library 718, the session log data structure 400 of FIG. 4, the e-book metadata data structure 500 of FIG. 5, and a notes data structure 720. The e-book library 718 of the illustrated example stores e-books (e.g., the e-book 106 of FIGS. 1, 2, and 6) for viewing via the e-book reader 100 of FIGS. 1 and 6. The notes data structure 720 of the illustrated example stores user-notes such as, for example, the user notes displayed in the user notes section 612 of FIG. 6. In some examples, the notes data structure 720 also stores community notes retrieved from Internet-accessible or network-accessible data storage locations and stored locally for displaying via the community notes section 614 of FIG. 6.

To exchange information or communicate with Internet-accessible or network-accessible data storage locations, the apparatus is provided with the one or more example communication interface(s) 716. In the illustrated example, the communication interface(s) 716 are wireless. Example wireless communication technologies that may be employed to implement the one or more communication interface(s) 716 include, for example, IEEE® 802.11 radio technology, BLUETOOTH® radio technology, ZIGBEE® radio technology, wireless USB radio technology, and ultra-wideband (UWB) radio technology. In some examples, one or more of the communication interface(s) 716 is/are implemented using the communication subsystem 804 of FIG. 8. Additionally or alternatively, one or more of the communication interface(s) 716 may be wired interfaces used to establish wired connections to access Internet-accessible or network-accessible data storage locations.

In the illustrated example, the communication interface(s) 716 communicate via an example network 730 (e.g., the Internet or other network) to retrieve and/or send information to one or more of a summary data store 732, a wiki data store 734, a blog data store 736, and/or a private/public user notes data store 738. The summary data store 732 of the illustrated example stores brief and detailed character summaries such as the character summaries disclosed above in connection with FIGS. 1-3 and brief and detailed general summaries such as the general summaries disclosed above in connection with FIG. 6. The summary data store 732 may be provided, maintained, and/or served by, for example, an e-book publisher, an e-book reseller, a third-party summary provider, or any other suitable entity. The wiki data store 734 of the illustrated example is a repository for information (e.g., summary information, user notes, or any other e-book-related information) posted by or otherwise provided by users via the Internet using wiki web page interfaces and procedures. The blog data store 736 of the illustrated example is also a repository for information (e.g., summary information, user notes, or any other e-book-related information) posted by or otherwise provided by users via the Internet using blog web page interfaces and procedures. The private/public user notes data store 738 of the illustrated example stores user notes generated by registered users of an Internet-based data storage service. Such Internet-based data storage service may be an e-book publisher, an e-book reseller, an online book club, an online social network service, and/or any other suitable service. In some examples, the private/public user notes data store 738 enables users to make their notes private. In this manner, users may access their private user notes from the private/public user notes data store 738 to view via their e-books (e.g., via the user notes section 612 of FIG. 6). Additionally or alternatively, the private/public user notes data store 738 enables users to make some or all of their notes public to other users. For example, the private/public user notes data store 738 may enable users to specify select users that are allowed access to their notes and/or may make some or all of their notes publicly available to anyone. In this manner, users may access the public notes from the private/public user notes data store 738 to view via their e-books (e.g., via the community notes section 614 of FIG. 6).

Figure 8:
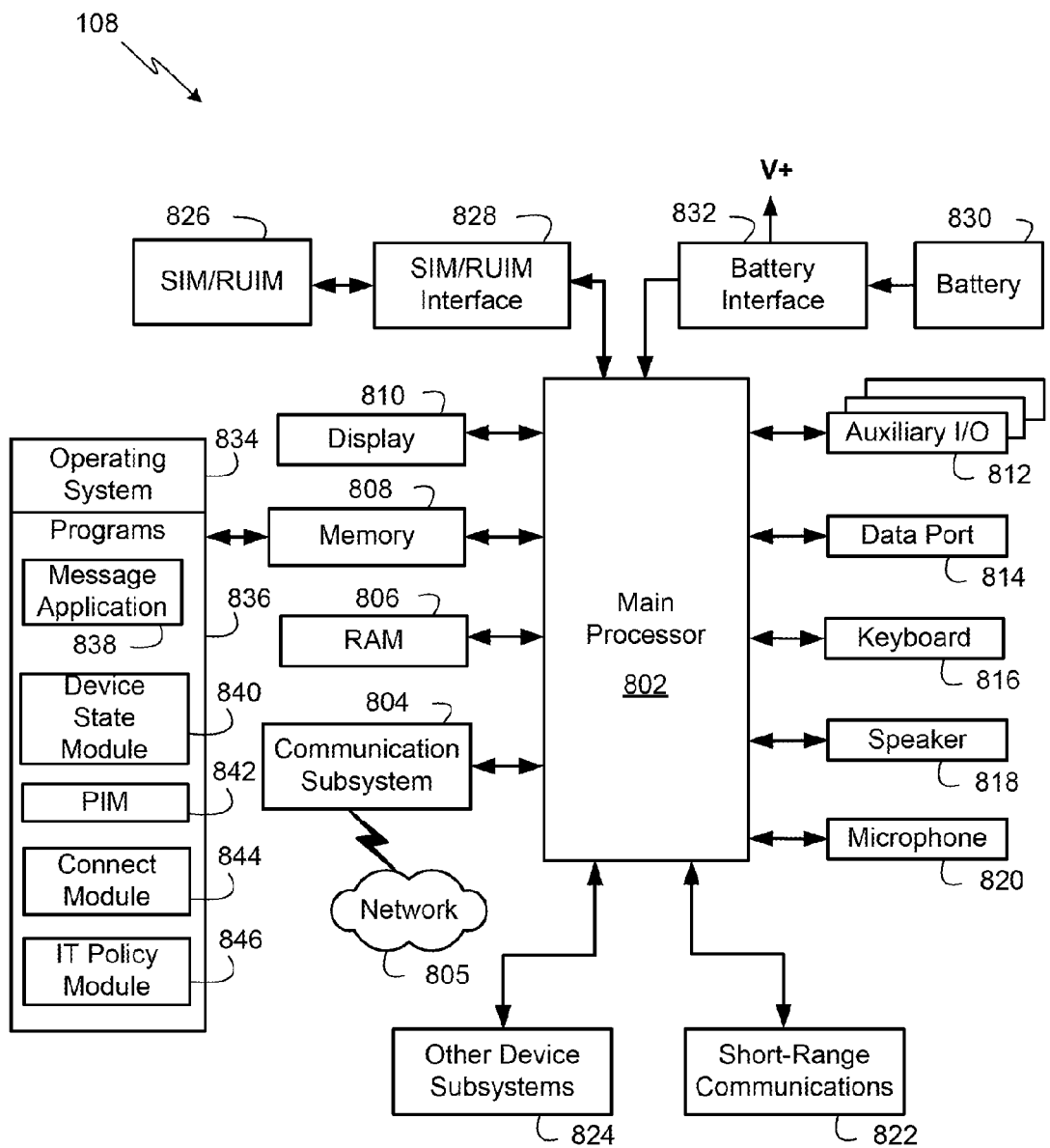
FIG. 8 illustrates an example block diagram of a mobile device that may be used to implement an example mobile device of FIGS. 1 and 6 and/or the example apparatus of FIG. 7.

FIG. 8 illustrates a block diagram of an example implementation of a processor system that may be used to implement the mobile device 108 of FIGS. 1 and 6. In the illustrated example, the mobile device 108 is a two-way communication device with advanced data communication capabilities including the capability to communicate with other wireless-enabled devices or computer systems through a network of transceiver stations. The mobile device 108 may also have the capability to allow voice communication. Depending on the functionality provided by the mobile device 108, it may be referred to as a data messaging device, a two-way pager, a cellular telephone with data messaging capabilities, a smart phone, a wireless Internet appliance, a data communication device (with or without telephony capabilities), or an e-book reader device. To aid the reader in understanding the structure of the mobile device 108 and how it communicates with other devices and host systems, FIG. 8 will now be described in detail.

Referring to FIG. 8, the mobile device 108 includes a number of components such as a main processor 802 that controls the overall operation of the mobile device 108. Communication functions, including data and voice communications, are performed through a communication subsystem 804. The communication subsystem 804 receives messages from and sends messages to a wireless network 805, which may implement or be in communication with the network 730 of FIG. 7. In the illustrated example of the mobile device 108, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example implementations described herein are intended to use any other suitable standards that are developed in the future. The wireless link connecting the communication subsystem 804 with the wireless network 805 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 805 associated with the mobile device 108 is a GSM/GPRS wireless network in one example implementation, other wireless networks may also be associated with the mobile device 108 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, MOBITEX® and DATATAC® network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, a persistent memory 808 (e.g., a non-volatile memory), a display 810, an auxiliary input/output (I/O) subsystem 812, a data port 814, a keyboard 816, a speaker 818, a microphone 820, short-range communications 822, and other device subsystems 824.

Some of the subsystems of the mobile device 108 perform communication-related functions, whereas other subsystems may provide "resident" or on-device functions. By way of example, the display 810 and the keyboard 816 may be used for both communication-related functions, such as entering a text message for transmission over the network 805, and device-resident functions such as a calculator or task list.

The mobile device 108 can send and receive communication signals over the wireless network 805 after required network registration or activation procedures have been completed. Network access is associated with a subscriber or user of the mobile device 108. To identify a subscriber, the mobile device 108 requires a SIM/RUIM card 826 (i.e., Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the mobile device 108 and to personalize the mobile device 108, among other things. Without the SIM card 826, the mobile device 108 is not fully operational for communication with the wireless network 805. By inserting the SIM card/RUIM 826 into the SIM/RUIM interface 828, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the persistent memory 808.

The mobile device 108 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the mobile device 108. Although current technology makes use of a battery, future technologies such as micro fuel cells may provide the power to the mobile device 108.

The mobile device 108 also includes an operating system 834 and software components 836 to 846 which are described in more detail below. The operating system 834 and the software components 836 to 846 that are executed by the main processor 802 are typically stored in a persistent store such as the persistent memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the mobile device 108 during its manufacture. Other software applications include a message application 838 that can be any suitable software program that allows a user of the mobile device 108 to send and receive electronic messages. Various alternatives exist for the message application 838 as is well known to those skilled in the art. Messages that have been sent or received by the user are typically stored in the persistent memory 808 of the mobile device 108 or some other suitable storage element in the mobile device 108. In at least some embodiments, some of the sent and received messages may be stored remotely from the mobile device 108 such as in a data store of an associated host system with which the mobile device 108 communicates.

The software applications can further include a device state module 840, a Personal Information Manager (PIM) 842, and other suitable modules (not shown). The device state module 840 provides persistence (i.e., the device state module 840 ensures that important device data is stored in persistent memory, such as the persistent memory 808, so that the data is not lost when the mobile device 108 is turned off or loses power).

The PIM 842 includes functionality for organizing and managing data items of interest to the user, such as, but not limited to, e-mail, contacts, calendar events, voice mails, appointments, and task items. A PIM application has the ability to send and receive data items via the wireless network 805. PIM data items may be seamlessly integrated, synchronized, and updated via the wireless network 805 with the mobile device subscriber's corresponding data items stored and/or associated with a host computer system. This functionality creates a mirrored host computer on the mobile device 108 with respect to such items. This can be particularly advantageous when the host computer system is the mobile device subscriber's office computer system.

The mobile device 108 also includes a connect module 844, and an IT policy module 846. The connect module 844 implements the communication protocols that are required for the mobile device 108 to communicate with the wireless infrastructure and any host system, such as an enterprise system, that the mobile device 108 is authorized to interface with.

The connect module 844 includes a set of APIs that can be integrated with the mobile device 108 to allow the mobile device 108 to use any number of services associated with the enterprise system. The connect module 844 allows the mobile device 108 to establish an end-to-end secure, authenticated communication pipe with the host system. A subset of applications for which access is provided by the connect module 844 can be used to pass IT policy commands from the host system (e.g., from an IT policy server of a host system) to the mobile device 108. This can be done in a wireless or wired manner. These instructions can then be passed to the IT policy module 846 to modify the configuration of the mobile device 108. Alternatively, in some cases, the IT policy update can also be done over a wired connection.

The IT policy module 846 receives IT policy data that encodes the IT policy. The IT policy module 846 then ensures that the IT policy data is authenticated by the mobile device 108. The IT policy data can then be stored in the flash memory 806 in its native form. After the IT policy data is stored, a global notification can be sent by the IT policy module 846 to all of the applications residing on the mobile device 108. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications (e.g., the e-book reader 100 of FIGS. 1 and 6) are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Other types of software applications can also be installed on the mobile device 108. These software applications can be third party applications, which are added after the manufacture of the mobile device 108. Examples of third party applications include games, calculators, utilities, etc.

The additional applications can be loaded onto the mobile device 108 through at least one of the wireless network 805, the auxiliary I/O subsystem 812, the data port 814, the short-range communications subsystem 822, or any other suitable device subsystem 824. This flexibility in application installation increases the functionality of the mobile device 108 and may provide enhanced on-device functions, communication-related functions, or both. For example, secure communication applications may enable electronic commerce functions and other such financial transactions to be performed using the mobile device 108.

The data port 814 enables a subscriber to set preferences through an external device or software application and extends the capabilities of the mobile device 108 by providing for information or software downloads to the mobile device 108 other than through a wireless communication network. The alternate download path may, for example, be used to load an encryption key onto the mobile device 108 through a direct and thus reliable and trusted connection to provide secure device communication.

The data port 814 can be any suitable port that enables data communication between the mobile device 108 and another computing device. The data port 814 can be a serial or a parallel port. In some instances, the data port 814 can be a USB port that includes data lines for data transfer and a supply line that can provide a charging current to charge the battery 830 of the mobile device 108.

The short-range communications subsystem 822 provides for communication between the mobile device 108 and different systems or devices, without the use of the wireless network 805. For example, the subsystem 822 may include an infrared device and associated circuits and components for short-range communication. Examples of short-range communication standards include standards developed by the Infrared Data Association (IrDA), a Bluetooth® communication standard, and the 802.11 family of standards developed by IEEE.

In use, a received signal such as a text message, an e-mail message, web page download, media content, etc. will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad. However, other types of keyboards may also be used. A composed item may be transmitted over the wireless network 805 through the communication subsystem 804.

For voice communications, the overall operation of the mobile device 108 is substantially similar, except that the received signals are output to the speaker 818, and signals for transmission are generated by the microphone 820. Alternative voice or audio I/O subsystems, such as a voice message recording subsystem, can also be implemented on the mobile device 108. Although voice or audio signal output is accomplished primarily through the speaker 818, the display 810 can also be used to provide additional information such as the identity of a calling party, duration of a voice call, or other voice call related information.

Figure 9A:
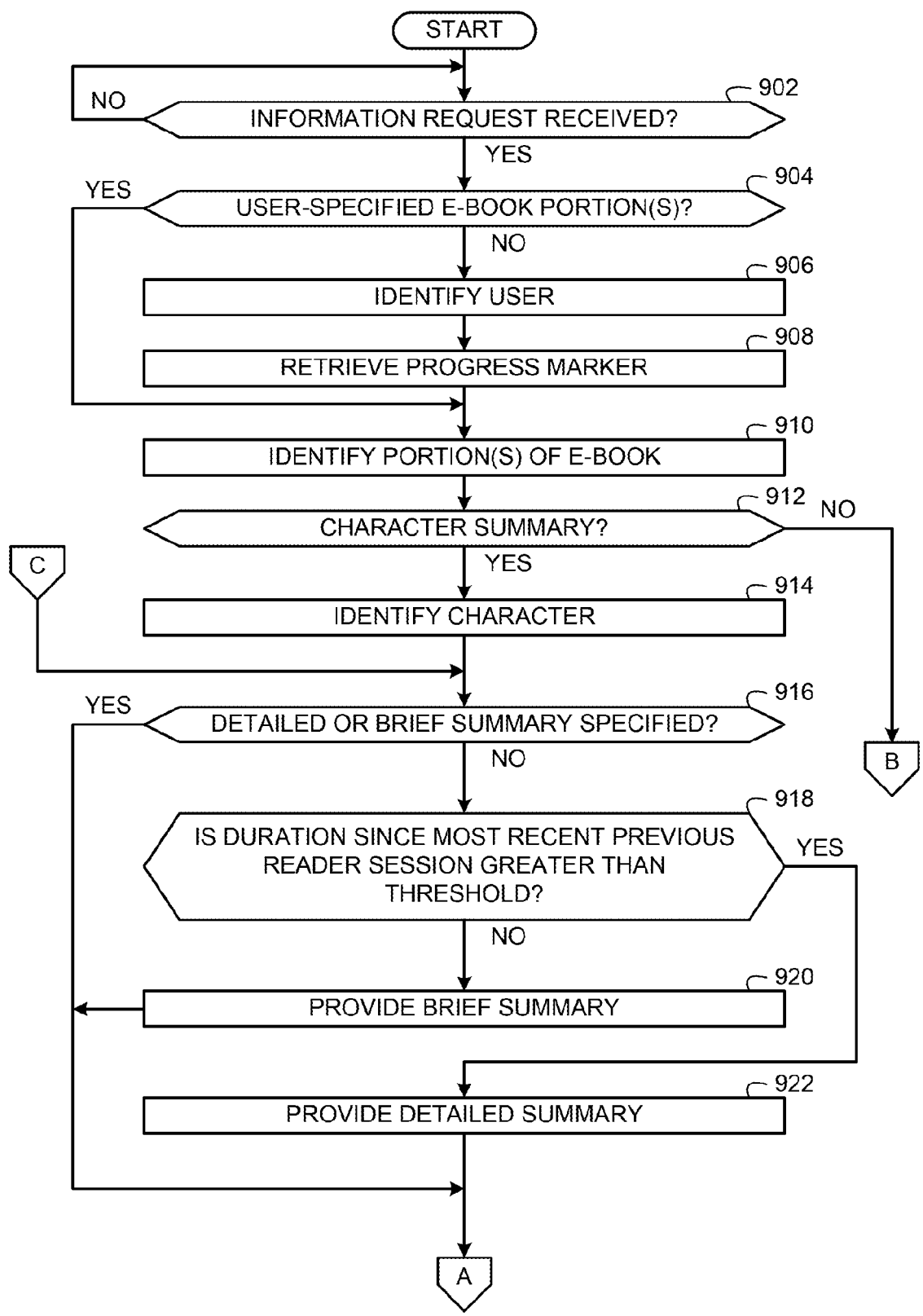
FIGS. 9A and 9B depict an example flow diagram representative of computer readable instructions that may be used to display e-book summaries and/or other related information associated with e-books.
Figure 9B:
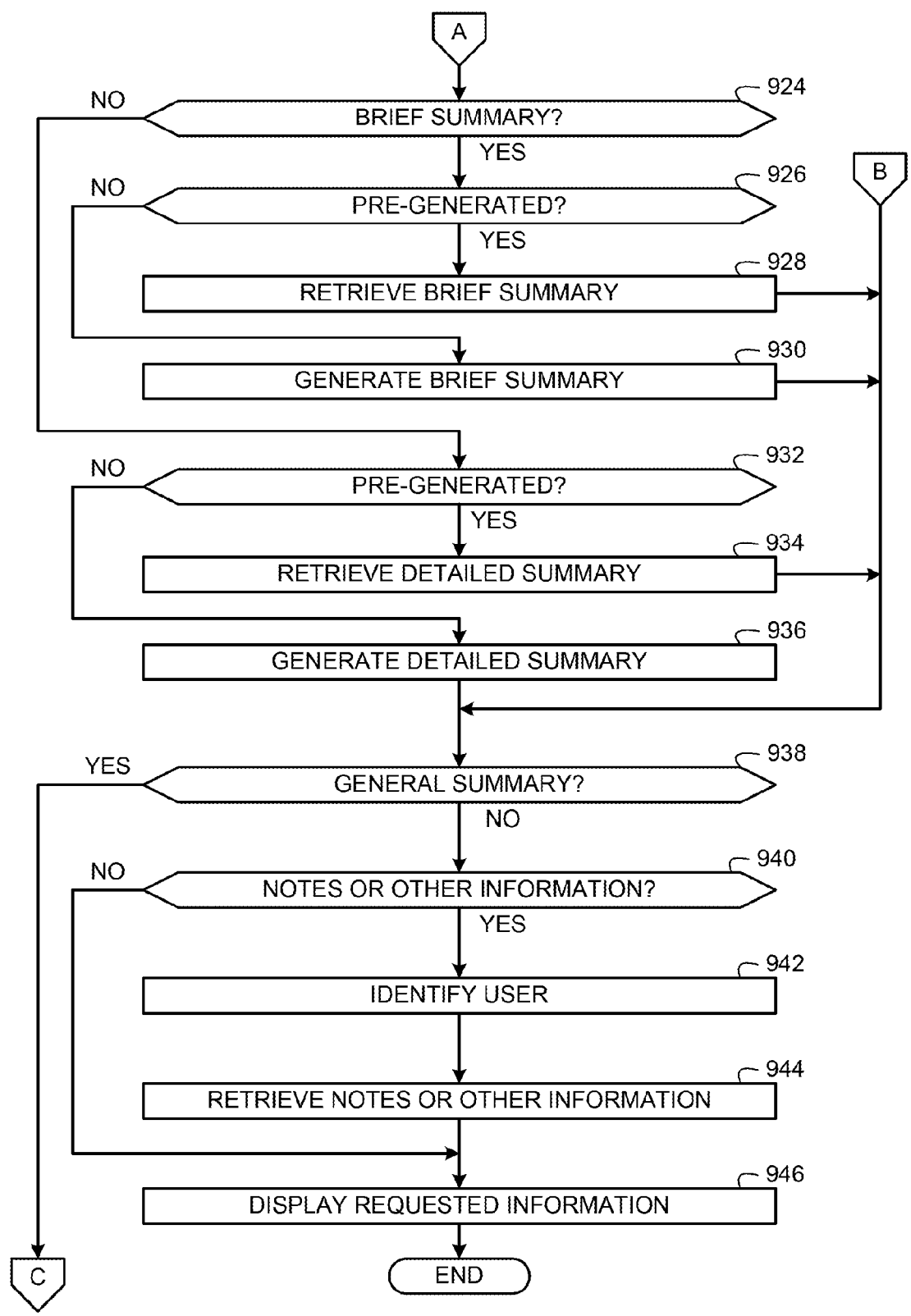

FIGS. 9A and 9B depict an example flow diagram representative of methods that may be implemented using, for example, computer readable instructions stored on a computer-readable medium to display e-book summaries and/or other related information associated with e-books. The example methods of FIGS. 9A and 9B may be performed using one or more processors, controllers, and/or any other suitable processing devices. For example, the example methods of FIGS. 9A and 9B may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example methods of FIGS. 9A and 9B may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all operations of the example methods of FIGS. 9A and 9B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all operations of the example methods of FIGS. 9A and 9B may be implemented manually or as any combination(s) of any of the foregoing techniques, for example, any combination of firmware, software, discrete logic and/or hardware. Further, although the example methods of FIGS. 9A and 9B are described with reference to the flow diagram of FIGS. 9A and 9B, other methods of implementing the methods of FIGS. 9A and 9B may be employed. For example, the order of execution of the blocks may be changed, and/or some of the blocks described may be changed, eliminated, sub-divided, or combined. Additionally, any or all operations of the example methods of FIGS. 9A and 9B may be performed sequentially and/or in parallel by, for example, separate processing threads, processors, devices, discrete logic, circuits, etc.

In the illustrated example, the methods of FIGS. 9A and 9B is described below as performed by the example e-book reader 100 of FIGS. 1 and 6 as implemented using the example mobile device 108 of FIGS. 1, 6, and 8 and the example apparatus 700 of FIG. 7. However, the example methods of FIGS. 9A and 9B may additionally or alternatively be implemented using any other suitable e-book reader and/or device.

Now turning in detail to FIG. 9A, initially the user interface 704 (FIG. 7) determines whether it has received an information request from a user (block 902). For example, an information request may be a request for one or more of summary information, user notes, community notes, commentaries, and/or any other information related to the e-book 106 of FIGS. 1, 2, and 6. In the illustrated example, the user interface 704 may detect the information request based on detection of a user-selection of a user-interface control (e.g., the summary options menu 114 of FIG. 1 or the general summary options menu 604 of FIG. 6) initiating the request for summary information or any other information. If an information request has not been received, control remains at block 902 until an information request is received. When an information request is received, control advances to block 904.

The demarcation identifier interface 708 (FIG. 7) determines whether one or more user-specified e-book portion(s) were received (block 904). For example, user-specified e-book portion(s) may be portions of an e-book specified by a user using, for example, page numbers, page ranges, specific chapters, chapter ranges, section numbers, etc. Such user-specified e-book portion(s) correspond to the portions of an e-book (e.g., the e-book 106 of FIGS. 1, 2, and 6) for which a user is requesting information via the information request received at block 902. If user-specified portions were received at block 904, control advances to block 910.

If the demarcation identifier interface 708 determines at block 904 that user-specified portions were not received, the user identifier interface 706 (FIG. 7) determines an identity of a user (block 906) that effected the information request received at block 902. For example, the user identifier interface 706 may identify a user based on login or sign-in credentials and/or any other suitable means for identifying a user. The demarcation identifier interface 708 then retrieves a progress marker (block 908) from, for example, the session log data structure 400 of FIG. 4. In the illustrated example, the progress marker (e.g., one of the progress markers 304a-d or 412 of FIGS. 3 and 4) corresponds to the user identified at block 906 and the e-book (e.g., the e-book 106) open and/or specified by the user.

The demarcation identifier interface 708 identifies one or more portion(s) of the e-book 106 (block 910) for which information should be retrieved for a user. In the illustrated example, one or more portion(s) of the e-book 106 are demarcated by received user-specified portions or by the progress marker retrieved at block 908. The processor 702 determines whether the information request received at block 902 has requested a character summary (block 912). If the information request does not request a character summary (block 912), control advances to block 938 (FIG. 9B).

If the processor 702 determines that the information request received at block 902 requests a character summary, the user interface 704 identifies a character (block 914) for which the character summary was requested. For example, the user interface 704 may determine a highlighted character name (e.g., the highlighted character name "Jonathan" of FIG. 1) for which a character summary is requested.

The processor 702 determines whether a user has specified a brief summary or a detailed summary (block 916). For example, a user may select a user-interface control such as the summary options menu 114 of FIG. 1 or the general summary options menu 604 of FIG. 6. If the user has not specified a brief summary or a detailed summary, the processor 702 compares a duration since a most recent previous reader session to a threshold to determine whether the duration is greater than the threshold (block 918). For example, the threshold may be any duration pre-configured or selected by a user or an e-book reader manufacturer or retailer within which a user is more likely to remember or retain important or interesting details of an e-book since a previous reading session during which the user read the e-book. For durations since a previous reading session of the e-book that are greater than the threshold, a user may be less likely to continue to retain or remember relatively more details of the e-book. In the illustrated example, the processor 702 determines the duration since the most recent previous reader session based on a time/date stamp stored in the progress marker (e.g., one of the progress markers 304a-d or 412 of FIG. 4) retrieved at block 908.

If the duration since the most recent previous reader session is not greater than the threshold, the processor 702 indicates that a brief summary should be provided (block 920). If the duration since the most recent previous reader session is greater than the threshold, the processor 702 indicates that a detailed summary should be provided (block 922). In the illustrated example, if the demarcation identifier interface 708 determines that user-specified e-book portion(s) were received at block 904 and, thus, a progress marker was not retrieved at block 908, the duration is assumed to be greater than the threshold at block 918 so that a detailed summary can be provided.

If a brief summary is to be generated (block 924) (FIG. 9B) (e.g., based on the type of summary specified by a user as determined at block 916 of FIG. 9A or based on the processor-indicated type of summary at block 920 of FIG. 9A), the processor 702 determines whether the requested brief summary is pre-generated (block 926). If the requested brief summary is pre-generated, the data retriever 710 (FIG. 7) retrieves the brief summary (block 928) and control advances to block 938. For example, the data retriever 710 may retrieve the pre-generated brief summary from local storage such as, for example, the e-book metadata data structure 500 of FIG. 5 stored in the memory 714 of FIG. 7 or may retrieve the pre-generated brief summary from remote storage such as, for example, the summary data store 732 of FIG. 7. If the requested brief summary is not pre-generated, the summary generator 712 (FIG. 7) dynamically generates the requested brief summary of the identified character name (block 930) and control advances to block 938. For example, the summary generator 712 (FIG. 7) may analyze the portion(s) of the e-book identified at block 910 as described above in connection with FIG. 2 and generate the requested brief summary based on the analyzed portion(s).

When the processor 702 determines at block 924 that the requested character summary is not a brief summary (e.g., based on the type of summary specified by a user as determined at block 916 of FIG. 9A or based on the processor-indicated type of summary at block 922 of FIG. 9A), control advances to block 932 to obtain a detailed summary. At block 932, the processor 702 determines whether the requested summary is pre-generated (block 932). If the requested detailed summary is pre-generated, the data retriever 710 (FIG. 7) retrieves the detailed summary (block 934) and control advances to block 938. For example, the data retriever 710 may retrieve the pre-generated detailed summary from local storage such as, for example, the e-book metadata data structure 500 of FIG. 5 stored in the memory 714 of FIG. 7 or may retrieve the pre-generated detailed summary from remote storage such as, for example, the summary data store 732 of FIG. 7. If the requested detailed summary is not pre-generated, the summary generator 712 (FIG. 7) dynamically generates the requested detailed summary of the identified character name (block 936) and control advances to block 938. For example, the summary generator 712 (FIG. 7) may analyze the portion(s) of the e-book identified at block 910 as described above in connection with FIG. 2 and generate the requested detailed summary based on the analyzed portion(s).

Although blocks 912, 914, 916, 918, 920, 922, 924, 926, 928, 930, 932, 934, and 936 are described above in connection with retrieving or generating a single character summary, such operations may be similarly used to generate character summaries for multiple character names specified by a user for display via the e-book reader 100.

After retrieving or generating a character summary or if the processor 702 determines at block 912 (FIG. 9A) that a character summary was not requested, the processor 702 determines whether a general summary was requested (block 938). In the illustrated example, if the processor 702 determines that a general summary was requested, operations 916, 918, 920, 922, 924, 926, 928, 930, 932, 934, and 936 are performed to retrieve or generate a brief general summary (e.g., the brief general summary of the brief general summary section 610 of FIG. 6) or a detailed summary as indicated by the processor 702 at block 920 or block 922 of FIG. 9A or as requested by a user. When a general summary section is not requested or when all requested general summaries have been retrieved or generated and no further general summaries are to be retrieved or generated, control advances to block 940.

The processor 702 determines whether user notes, community notes, and/or any other e-book-related information were requested in the information request received at block 902 (block 940). If user notes, community notes, and/or other e-book-related information were not requested, control advances to block 946. If user notes, community notes, and/or any other e-book-related information were requested, the user identifier interface 706 identifies the requesting user (block 942). For example, the user identifier interface 706 may identify a user based on login or sign-in credentials and/or any other suitable means for identifying a user. The data retriever 710 retrieves the requested user notes, community notes, and/or other information (block 944) from, for example, the locally stored notes data structure 720 of FIG. 7 and/or from remote storage locations such as the wiki data store 734, the blog data store 736, and/or the private/public user notes data store 738 of FIG. 7.

The user interface 704 then displays the summary information, the user notes, the community notes, and/or any other requested information (block 946) via the e-book reader 100 (e.g., via the display 810 of FIG. 8). For example, the user interface 704 can display character summary information in a manner substantially similar or identical to the display of character summary information in FIG. 1 and/or the user interface 704 can display general summary information, user notes, and/or community notes in a manner substantially similar or identical to the display of general summary information, user notes, and/or community notes in FIG. 6. The example methods of FIGS. 9A and 9B then end.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to display on a display of a mobile device, summary information for an electronic book, the method, performed by a computer processor, comprising:
   during an electronic book reader session, receiving, at an electronic book reader, a request by a user for a summary associated with the electronic book, wherein the electronic book reader includes a user interface;
   obtaining a marker indicative of a location in the electronic book, the marker demarcates a user's progress through the electronic book;
   obtaining the summary for a portion of the electronic book demarcated by the marker, wherein obtaining the summary for the portion of the electronic book comprises:
   receiving, from the user, a user input that identifies identifying a name of a character portrayed in the electronic book;
   identifying chapters of the electronic book associated with the user's progress through the electronic book; and
   obtaining a listing of at least one chapter in the identified chapters, the at least one chapter mentioning the character; and
   displaying, at the user interface and in response to the request, the summary via the electronic book reader, wherein the summary comprises at least one of a summary of events related to the character name or a summary of characteristics of a character identified by the character name that are revealed in the portion of the electronic book demarcated by the marker;
   wherein obtaining the summary for the portion of the electronic book comprises:
   obtaining a brief summary when the request for the summary is a request for a brief summary; and
   obtaining a detailed summary when the request for the summary is a request for a detailed summary.

2. The method as defined in claim 1, wherein obtaining the marker comprises accessing a session log in a database indicative of the user's progress through the electronic book during a previous electronic book reader session.

3. The method as defined in claim 1, wherein obtaining the summary for the portion of the electronic book further comprises:
   obtaining a brief summary when the electronic book reader session for the electronic book occurs before a threshold duration since a most recent previous electronic book reader session for the electronic book; and
   obtaining a detailed summary when the electronic book reader session for the electronic book occurs after the threshold duration since the most recent previous electronic book reader session for the electronic book.

4. The method as defined in claim 1, wherein obtaining the summary for the portion of the electronic book further comprises:
   identifying a name of a character portrayed in the electronic book; and
   obtaining one or more summaries of relationships between the character and one or more other characters revealed in the portion of the electronic book demarcated by the marker.

5. An apparatus to display summary information for an electronic book, comprising:
a processor; and
a memory in communication with the processor having instructions stored thereon that, when executed, cause the processor to:
 receive, at an electronic book reader, a request by a user for a summary associated with an electronic book accessible via the electronic book reader;
 obtain a marker indicative of a location in the electronic book, the marker demarcates a user's progress through the electronic book;
 obtain the summary for a portion of the electronic book demarcated by the marker, wherein obtaining the summary for the portion of the electronic book comprises:
 identifying a name of a character portrayed in the electronic book, the name is input from the user;
 identifying chapters of the electronic book associated with the user's progress through the electronic book; and
 obtaining a listing of at least one chapter in the identified chapters, the at least one chapter mentioning the character; and
 display the summary via the electronic book reader, wherein the summary comprises at least one of a summary of events related to the character name or a summary of characteristics of a character identified by the character name that are revealed in the portion of the electronic book demarcated by the marker;
 wherein obtaining the summary for the portion of the electronic book comprises:
 obtaining a brief summary when the request for the summary is a request for a brief summary; and
 obtaining a detailed summary when the request for the summary is a request for a detailed summary.

6. The apparatus as defined in claim 5, wherein obtaining the marker comprises accessing a session log in a database indicative of the user's progress through the electronic book during a previous electronic book reader session.

7. The apparatus as defined in claim 5, wherein the instructions, when executed, further cause the processor to obtain the summary for the portion of the electronic book by:
 obtaining a brief summary when the electronic book reader session for the electronic book occurs before a threshold duration since a most recent previous electronic book reader session for the electronic book; and
 obtaining a detailed summary when the electronic book reader session for the electronic book occurs after the threshold duration since the most recent previous electronic book reader session for the electronic book.

8. The apparatus as defined in claim 5, wherein the instructions, when executed, further cause the processor to obtain the summary for the portion of the electronic book by:
 identifying a name of a character portrayed in the electronic book; and
 obtaining one or more summaries of relationships between the character and one or more other characters revealed in the portion of the electronic book demarcated by the marker.

* * * * *

UNITED STATES PATENT AND TRADEMARK OFFICE
CERTIFICATE OF CORRECTION

PATENT NO. : 9,218,320 B2
APPLICATION NO. : 13/583571
DATED : December 22, 2015
INVENTOR(S) : Salvatore Ierullo Page 1 of 1

It is certified that error appears in the above-identified patent and that said Letters Patent is hereby corrected as shown below:

In the Claims:

Column 20, Lines 23-24, In Claim 1, after "identifies" delete "identifying".

Signed and Sealed this
Twenty-third Day of August, 2016

Michelle K. Lee
*Director of the United States Patent and Trademark Office*